United States Patent [19]

Hayes

[11] Patent Number: 4,851,505
[45] Date of Patent: Jul. 25, 1989

[54] HIGHLY SOLUBLE AROMATIC POLYIMIDES

[75] Inventor: Richard A. Hayes, Hockessin, Del.

[73] Assignee: E. I. Du Pont de Nemours and Company, Wilmington, Del.

[21] Appl. No.: 175,501

[22] Filed: Apr. 13, 1988

[51] Int. Cl.[4] .............................................. C08G 69/26
[52] U.S. Cl. .................................... 528/353; 528/125; 528/126; 528/128; 528/172; 528/185; 528/352
[58] Field of Search ............... 528/353, 125, 126, 128, 528/172, 185, 352

[56] References Cited

U.S. PATENT DOCUMENTS

| | | | |
|---|---|---|---|
| 3,356,648 | 12/1967 | Rogers | 260/47 |
| 3,423,491 | 1/1969 | McLain et al. | 264/49 |
| 3,546,175 | 12/1970 | Angelo | 260/65 |
| 3,642,682 | 2/1972 | Vincent et al. | 260/30.4 N |
| 3,705,869 | 12/1972 | Darmory et al. | 260/30.2 R |
| 3,705,870 | 12/1972 | Darmory et al. | 260/30.2 R |
| 3,758,434 | 9/1973 | Kunzel et al. | 260/30.2 R |
| 3,787,367 | 1/1974 | Farrissey et al. | 260/65 |
| 3,803,075 | 4/1974 | Kray et al. | 260/30.2 |
| 3,856,752 | 12/1974 | Abstract . | |
| 3,957,651 | 5/1976 | Kesting | 210/490 |
| 3,959,350 | 5/1976 | Rogers | 260/47 |
| 4,078,142 | 7/1978 | Abstract . | |
| 4,145,522 | 3/1979 | Abstract . | |
| 4,378,324 | 3/1983 | Makino et al. | 264/41 |
| 4,378,400 | 3/1983 | Makino et al. | 428/220 |
| 4,588,804 | 5/1986 | Fryd | 528/125 |
| 4,607,093 | 8/1986 | Sun | 528/322 |
| 4,629,685 | 12/1986 | Pfeifer | 430/583 |
| 4,629,777 | 12/1986 | Pfeifer | 528/353 |
| 4,656,116 | 4/1987 | Rohde et al. | 430/197 |
| 4,696,994 | 9/1987 | Nakajima et al. | 528/176 |

FOREIGN PATENT DOCUMENTS

| | | |
|---|---|---|
| 132221 | 1/1985 | European Pat. Off. . |
| 141781 | 5/1985 | European Pat. Off. . |
| 181837 | 5/1986 | European Pat. Off. . |
| 2050251 | 7/1969 | France . |
| 61-195125 | 8/1986 | Japan . |
| 2176196 | 12/1986 | United Kingdom . |

OTHER PUBLICATIONS

NASA Technical Memorandum 89016; Sep. 1986; St. Clair, Anne K. & Terry L.; "Soluble Aromatic Polyimides for Film Coating Applications", pp. 1-10.

Primary Examiner—John Kight
Assistant Examiner—M. L. Moore
Attorney, Agent, or Firm—Frank C. Hilberg, Jr.

[57] ABSTRACT

Highly soluble, optically transparent aromatic polyimides of the following formula are disclosed:

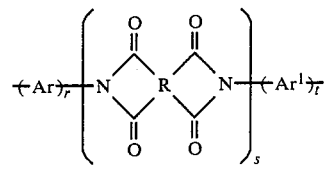

where —Ar— is

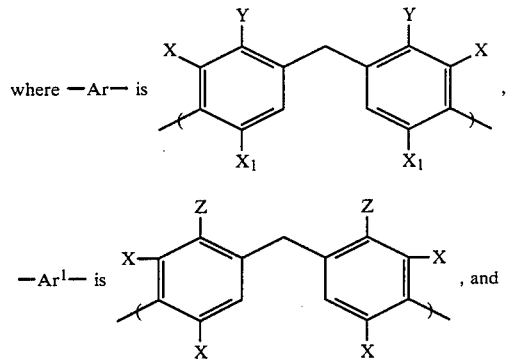

—Ar[1]— is , and

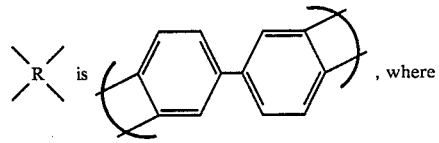

R is , where where
—X and —X$_1$ are independently primary or secondary alkyl groups having 1 to 6 carbon atoms,
—X is different than —X$_1$,
—Y is independently —H, or —Z,
—Z is independently —Cl, —Br or —I,
r=0–100% of r+t, and
s=100%
t=100% —r of r+t are disclosed.

8 Claims, No Drawings

HIGHLY SOLUBLE AROMATIC POLYIMIDES

BACKGROUND OF THE INVENTION

The present invention relates to a class of fully-cyclized aromatic-polyimides prepared from an alkyl substituted 4,4,-methylene-bisaniline and 3,3',4,4'-biphenyltetracarboxylic dianhydride (BPDA) which are soluble in aprotic solvents.

PRIOR ART

U.S. Pat. No. 4,378,400 discloses BPDA-based polyimides and their utility as gas separation membranes. U.S. Pat. No. 4,378,400 (col. 10, lines 19-21) discloses that one of its examples is insoluble in dimethyl acetamide. U.S. Pat. Nos. 4,378,324, 4,486,376, 4,528,004, 4,370,290, 4,440,643, 4,460,526, 4,474,662, 4,474,858, 4,485,056, 4,512,893, and 4,535,105 disclose fabrication processes and the like for this class of polyimides, but do not disclose solubility in good aprotic solvents. U.K. Patent Application G.B. No. 2,176,196 A discloses use of BPDA-based moldable polyimide powders and their production. Their production process is based on the insolubility of BPDA-based polyimides in good aprotic solvents, such as N-methylpyrrolidone.

Japanese Patent Application Publication No. 61-195125 discloses the solubility in good aprotic solvents, such as N-methylpyrrolidone, of the polyimide prepared from 9,10-bis(amino phenyl) anthracene with 2,3,3',4'-biphenyltetracarboxylic dianhydride, a structural isomer of BPDA. They do not disclose solubility in good aprotic solvents for the polyimide prepared from the same diamine with BPDA.

U.S. Pat. No. 4,696,994 disloses the solubility in good aprotic solvents, such as N-methylpyrrolidone, of polyimides prepared from BPDA with bis(amino- phenoxyphenyl) sulfones or bis(aminophenoxy-phenyl) propanes.

European Patent Applications Nos. 132,221; 141,781; and 181,837 disclose aromatic polyimides in which the diamines are substituted with alkyl groups. Biphenyl tetracarboxylic dianhydride is not used in any of the examples of these patent applications.

U.S. Pat. Nos. 4,629,685; 4,629,777, and 4,656,116 disclose highly alkyl substituted aromatic polyimides some of which are soluble in good aprotic solvents. They do not disclose these polyimides to be soluble in weaker solvents. BPDA is not used in any of the examples of these patents.

U.S. Pat. No. 3,356,648 discloses polyamide acids and polyimides from hexafluoropropylidene bridged diamines and dianhydrides to be soluble in relatively weak solvents such as acetone but not in weaker solvents such as toluene. BPDA is not used in any of the examples of this patent.

U.S. Pat. No. 3,959,350 describes polyimides soluble in good aprotic solvents. They do not exemplify solubility in weaker solvents. BPDA is not used in any of the examples of this patent.

U.S. Pat. No. 3,705,870 describes soluble polyimides prepared from 2,4-diaminodiphenylamines and 2,4-diaminophenyl sulfides. They do not disclose solubility in weak solvents. BPDA is not used in any of the examples of this patent.

U.S. Pat. No. 3,705,869 describes soluble polyimides derived from 3,3-bis(p-aminophenyl)-1-phenyl oxindole. They do not disclose solubility in weak solvents. BPDA is not used in any of the examples of this patent.

U.S. Pat. No. 3,758,434 describes polyimides which are soluble in good, aprotic solvents. They do not disclose solubility in weaker solvents. BPDA is not used in any of the examples of this patent.

U.S. Pat. No. 3,787,367 describes soluble copolyimides. They do not disclose solubility in weaker solvents. BPDA is not used in any of the examples of this patent.

U.S. Pat. No. 3,803,075 describes soluble polyimides from 2,6-diamino-s-triazines. They demonstrate that their materials are insoluble in weak solvents. BPDA is not used in any of the examples of the patent.

U.S. Pat. No. 3,856,752 describes soluble polyimides prepared from phenylindane diamines and dianhydrides. They do not disclose solubility in weak solvents. BPDA is not used in any of the examples of this patent.

U.S. Pat. Nos. 4,078,142 and 4,145,522 describe polyimide materials which have improved solubility. However, no solubility information was disclosed. BPDA is not used in any of the examples of these patents.

U.S. Pat. No. 3,546,175 describes soluble polyimides from 2,4-diaminoisopropylbenzene and pyromellitic dianhydride and 3,3',4,4'-benzophenonetetracarboxylic dianhydride. These materials were found to only be soluble in good aprotic solvents. BPDA is not used in any of the examples of this patent.

U.S. Pat. No. 3,642,682 describes soluble polyimides from guanamine-based diamines. They do disclose that weak solvents may be used as diluents or cosolvents with good, aprotic solvents for their materials. BPDA is not used in any of the examples of this patent.

U.S. Pat. No. 4,588,804 describes a series of soluble polyimides. They do not disclose solubility in weak solvents. BPDA is not used in any of the examples of this patent.

U.S. Pat. No. 4,607,093 describes soluble polyimides. Their materials are disclosed not to be soluble in weak solvents. BPDA is not used in any of the examples of this patent.

NASA-TM-89016 describes soluble polyimides. These polyimides are not disclosed to be soluble in weak solvents and no use of BPDA is described.

SUMMARY OF THE INVENTION

The present invention relates to aromatic polyimides which are soluble in a wider solvent range than found before in their class. Films formed of these polyimides are essentially optically transparent and colorless. The polyimides of the present invention are formed from a dianhydride which is biphenyltetracarboxylic dianhydride and a 4,4'-methylene-bis-aniline which is substituted with alkyl groups adjacent to the amino groups and in certain cases further substituted with halogen atoms.

DETAILED DESCRIPTION

Aromatic polyimides, as a class, tend to be insoluble in most solvents. This insolubility, along with high softening temperature, has made aromatic polyimides difficult to fabricate into many types of products. The fabrication of films, coatings, and other structures from insoluble aromatic polyimides requires elaborate processes such as coalescing powders formed thereof. Another fabrication technique involves forming films from the soluble polyamide acid precursor of an insoluble polyimide. The film, after removal of excess solvent, must undergo a thermal or chemical dehydration to convert the precursor film to the polyimide film. There are further problems, such as void formation caused by evolution of the by-product, water, during the imidization step.

The above-mentioned shortcomings have been circumvented in the art through the invention of soluble, fully-cyclized polyimides. Soluble, fully-cyclized 3,3',4,4'-biphenyltetracarboxylic dianhydride (BPDA)-based polyimides have been disclosed in the prior art. These generally suffer from being only soluble in chlorinated solvents, such as dichloromethane, and phenolic solvents, such as cresol. Such solvents present problems due to health hazards. For example, cresols are highly toxic when contacted, and dichloromethane may present respiration disorders on breathing vapors. These problems can be circumvented through the use of BPDA-based polyimides which are soluble in a wider range of aprotic solvents, such as N-methylpyrrolidone, N,N,-dimethylacetamide, dimethylformamide, dimethylsulfoxide, toluene, and the like.

The present invention circumvents the above shortcomings and provides the first known class of fully-cyclized BPDA-based polyimides which are soluble in a wide range of aprotic solvents, spanning from N-methylpyrrolidone (NMP) to toluene. This class of polyimides is compositionally prepared essentially from substituted methylene dianilines and 3,3',4,4'-biphenyltetracarboxylic dianhydride (from now on to be expressed as BPDA). Suitable polyimide compositions which are soluble in a wide range of aprotic solvents include polyimides with the following repeating units:

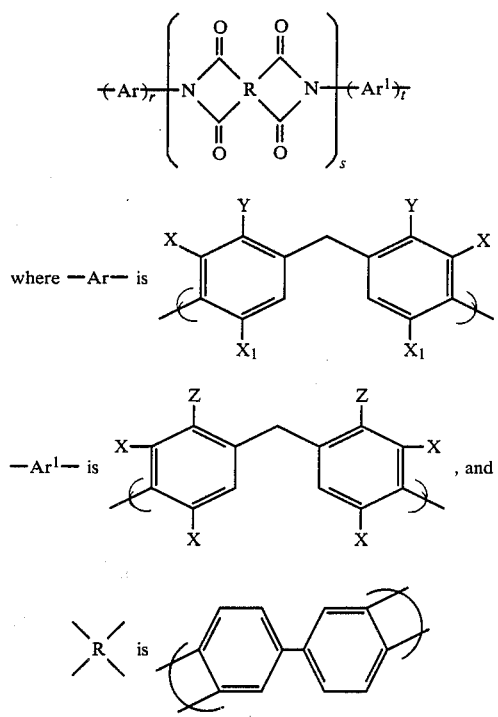

—X and $X_1$ are independently primary or secondary alkyl groups having 1 to 6 carbon atoms preferably methyl, ethyl, or isopropyl,
—X is different from —$X_1$
—Y is independently —H, or —Z.

—Z is independently —Cl, —Br or —I, preferably —Cl.
r = 0–100% of r+t
s = 100%
t = 100% −r of r+t It is believed that the surprising solubility found for this class of high temperature BPDA-based polyimides in a wide range of aprotic solvents is a direct result of a combination of structural features incorporated therein. As taught in the prior art,, some fully-cyclized aromatic polyimides which incorporate 3,3',4,4'-biphenyltetracarboxylic dianhydride (BPDA) are soluble in chlorinated solvents, such as dichloromethane, and phenolic solvents, such as cresols. This solubility is not entirely understood. Generally, BPDA-based polyimides are insoluble in aprotic solvents. For example, BPDA-based polyimides precipitate out of solution as powders when prepared in good aprotic solvents such as N,N-dimethyl acetamide (U.S. Pat. No. 4,378,400; column 10, line 21) and N-methylpyrrolidone (U.S. Pat. No. 4,508,766; column 7, line 14). This insolubility in aprotic solvents has been exploited for the preparation of BPDA-based moldable polyimide powders (U.K. Patent Application GB No. 2,176,196A). In only one case, BPDA-based polyimides have been disclosed to be soluble in good aprotic solvents (U.S. Pat. No. 4,696,994). The incorporation of BPDA into polyimides, heretofore, has not been a sufficient criteria to provide polymer solubility in a wide range of aprotic solvents.

The ortho-alkyl substituents around the diamine function tend to sterically-crowd the imide linkage. This causes the aromatic residue of the diamine function to be held out of the plane of the imide function and the aromatic residue of the dianhydride residue. Electronic ring conjugation within the aromatic polyimide chain is, therefore, greatly reduced. Further, the above-mentioned alkyl substituents sterically block strong electronic interactions between different polyimide chains within a film and/or coating. However, as taught in the prior art and in the comparative examples herein, the incorporation of ortho-alkyl substituents is not, by itself, a sufficient criterion to provide enhanced polymer solubility in good aprotic solvents such as N-methylpyrrolidone.

The incorporation of structurally different ortho-alkyl substituents about the diamine function and/or the incorporation of meta-halide substituents around the ortho-alkyl substituted diamine function causes even greater disorder in the polymer chain. This polymer chain disorder further disrupts the macromolecular structure of the polyimide chain, thus causing greater hindrance to intra-chain organization within a film and/or coating.

The combination of the above-mentioned structural features serves to greatly reduce inter-chain and intra-chain interactions. It is believed that this reduction serves to provide the surprising solubilities of this class of high temperature BPDA-based polyimides in a wide range of aprotic solvents. Examples of the herein described BPDA-based polyimides have been found to be soluble in a surprisingly wide range of aprotic solvents spanning from good aprotic solvents, such as N-methylpyrrolidone, to very weak aprotic solvents, such as toluene. Regardless of the mechanism, the finding that the class of polyimides described herein have greatly enhanced solubilities in good aprotic solvents is surprising in light of the prior art.

The solubility of the above-described class of polyimides in good aprotic solvents greatly facilitates the fabrication of BPDA-based polyimides into many products. The fabrication of films, coatings, and other structures from insoluble polyimides requires extensive processes, as described before. Further, the fabrication of such products from the class of fully-cyclized BPDA-based polyimides which are soluble in chlorinated solvents, such as dichloromethane, and phenolic solvents, such as cresols, as are described in the prior art, are complicated by the hazards associated with these solvents. The invention of the herein described class of fully-cyclized BPDA-based polyimides soluble in good aprotic solvents, such as N-methylpyrrolidone, greatly simplifies the fabrication processes for the production of films, coatings, and the like.

Examples of the above-described class of BPDA-based polyimides have been found to be soluble in weak aprotic solvents, such as toluene. Solubility in weaker solvents offers unique fabrication opportunities not available to insoluble or less soluble polyimides. It is difficult to fabricate multilayer structures in which the material of the coating is soluble only in solvents to which the material of the substrate is sensitive. This problem is solved when polyimide materials are available which are soluble in weaker solvents in which the material of the substrate is insensitive. An example of the above can occur in the application of a polyimide passivating coating on electronic devices.

The polyimides disclosed herein find use in gas separations and in electronic applications such as protective coatings.

DESCRIPTION OF THE PREFERRED EMBODIMENTS

Example 1

To a stirred solution of 4,4'-methylene-bis(2-methyl-6-isopropyl aniline) (31.0 g, 0.10 mol) in N-methylpyrrolidone (250 ml) was added 3,3',4,4'-biphenyltetracarboxylic dianhydride (BPDA, 29.7 g, 0.101 mol, last portion washed in with an additional 50 ml N-methylpyrrolidone) under an !0 inert atmosphere at room temperature. After the dark orange solution had been stirred overnight at room temperature, a solution of acetic anhydride (37.7 ml, 0.4 mol) and triethylamine (55.8 ml, 0.4 mol) was added with rapid stirring. The resultant light orange solution was stirred at room temperature for 4 hours and then precipitated in water. The off-white solid was collected by filtration, washed twice with water and washed twice with methanol. The polymer was air dried overnight, and then dried in a vacuum oven (20 inches mercury) at room temperature overnight, at 120° C. for 3 hours and at 250° C. for 5 hours to yield 53.2 g product.

This polyimide is soluble at greater than 20% solids (based on polymer weight) in good aprotic solvents such as N-methylpyrrolidone, dimethyl sulfoxide and dimethylacetamide as well as in dichloromethane and meta-cresol.

Differential Scanning Calorimetry (DSC) was performed on the above polymer using a Du Pont Thermal Analyzer Model 990-3 with cell model HCBl-5/N00523, Baseline slope =5.0 in a nitrogen atmosphere at a 10° C./minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss was observed at 515° C.

Films of the polyimide prepared above were cast from a 15% polymer solution (based on weight) in N-methylpyrrolidone onto a glass plate treated with TEFLON ® dry lubricant at 100° C. with a 15-mil (38.4× $10^{-5}$ m) knife gap. (TEFLON ® dry lubricant contains a fluorocarbon telomer which reduces the adhesion of the film to the glass plate). The films were dried on the plate at 100° C. for 25 minutes, cooled to room temperature and further dried in a vacuum oven (20 inches mercury) at room temperature overnight. The films were stripped off the plate and dried in a vacuum oven at 120° C. for 4 hours.

The clear films were tough and flexible and could be creased without cracking.

Example 2

To a stirred solution of 4,4'-methylene-bis(3-chloro-2,6-diethylaniline) 189.5 g, 0.5 mol) in N-methylpyrrolidone (1,000 ml) was added 3,3',4,4'-biphenyltetracarboxylic dianhydride (BPDA. 148.6 g, 0.505 mol, last portion washed in with an additional 100 ml N-methylpyrrolidone) at room temperature with a slight nitrogen purge. The reaction solution was slowly heated to the boiling point of N-methylpyrrolidone (204.C) while allowing volatiles to distill out. After 300 ml of the water/N-methylpyrrolidone solution had distilled out over 3.5 hours, the distillates were allowed to flow back into the reaction solution. After the very viscous reaction solution had run for a total of 6.7 hours at about 204° C., the reaction was allowed to slowly cool to room temperature. The solution was diluted with N-methylpyrrolidone and precipitated in water. The resulting solid was successively washed with water and methanol. The off-white polymer was air-dried overnight and then dried in a vacuum oven (20 inches mercury) at 120° C. for 3 hours and at 250° C. for 5 hours to yield 326.8 g product.

This polyimide is soluble in weak aprotic solvents such as toluene and in good aprotic solvents such as a N-methylpyrrolidone and dimethylacetamide as well as in dichloromethane and meta-cresol.

Differential Scanning Calorimetry (DSC) was performed on the above polymer using a Du Pont Thermal Analyzer Model 990-3 with cell model HCBl-5/N00523, Baseline slope=5.0 in a nitrogen atmosphere at a 10.C/minute progress rate. No transitions correlatable to a Tg were observed up to 400° C. by this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 400° C. and a 40% weight loss was observed at 490° C.

Example 3

To a stirred solution of 4,4'-methylene-bis(2-ethyl-6-methylaniline) (28.2 g, 0.10 mol) in N-methylpyrrolidone (250 ml) was added 3,3',4,4'-biphenyltetracarboxylic dianhydride (BPDA, 29.7 g, 0.101 mol, last portion washed in with an additional 50 ml N-methylpyrrolidone) under an inert atmosphere at room temperature. After the yellow-orange solution had stirred overnight at room temperature, a solution of acetic anhydride (37.7 ml, 0.4 mol), triethylamine (55.8 ml, 0.4 mol), and N-methylpyrrolidone (150 ml) was added with rapid stirring. The resulting yellow solution was stirred at room temperature for 4 hours and then precipitated in water. The polymer was washed twice with water and twice with methanol. After air drying overnight, the solid was dried in a vacuum oven (20 inches mercury) at 120° C. for 3 hours and at 250° C. for 5 hours to give 55 g product.

This polyimide is soluble at greater than 20% solids (based on polymer weight) in the good aprotic solvent N-methylpyrrolidone as well as in dichloromethane and meta-cresol.

Differential Scanning Calorimetry (DSC) was performed on the above polymer using a Du Pont Thermal Analyzer Model 990-3 with cell model HCB1-5/N00523, Baseline slope =5.0 in a nitrogen atmosphere at a 10° C./minute progress rate. No transitions correlatable to a Tg were observed up to 400° C. of this method.

Thermogravimetric Analysis (TGA) was performed on the above polymer using a Du Pont Thermogravimetric Analyzer Model 99-2 with a cell Model 951-5 in an air atmosphere at a 10° C./minute progress rate. A 5% weight loss was observed at 410° C. and a 40% weight loss was observed at 510° C.

Comparative Example 1

To a stirred solution of 4,4'-methylene-bis(2,6-diethylaniline) (31.0 g, 0.10 mol) in N-methylpyrrolidone (350 ml) was added 3,3',4,4'-biphenyltetracarboxylic dianhydride (BPDA, 29.7 g, 0.101 mol, last portion washed in with an additional 50 ml N-methylpyrrolidone) under an inert atmosphere at room temperature. After the orange solution had stirred overnight at room temperature, a solution of acetic anhydride (37.7 ml, 0.4 mol), triethylamine (55.8 ml, 0.4 mol) and N-methylpyrrolidone (150 ml) was added with rapid stirring. The light yellow solution gelled after less than 5 minutes. After the reaction mixture sat at room temperature for 4 hours, the mixture was precipitated in water. The resulting off-white solid was washed twice with water and twice with methanol. After air drying overnight, the solid was dried in a vacuum oven(20 inches mercury) at 120° C. for 3 hours and at 250° C. for 5 hours to give 55 g product.

This polyimide is swollen but insoluble in good aprotic solvents such as N-methylpyrrolidone, dimethylacetamide and dimethylsulfoxide. The polyimide is soluble in a dichloromethane and meta-cresol.

I claim:

1. An aromatic polyimide consisting essentially of repeating units of the formula

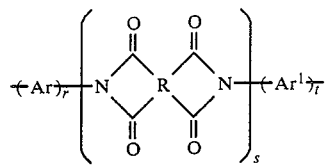

where —Ar— is

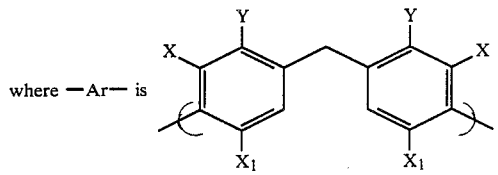

—Ar¹— is

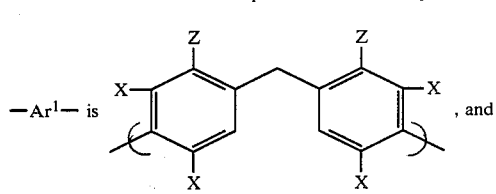

, and

R is

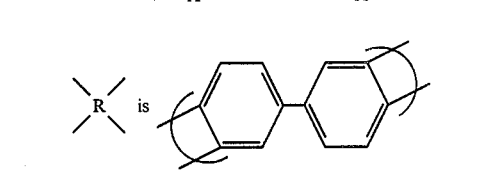

where —X and —X₁ are independently primary or secondary alkyl groups having 1 to 6 carbon atoms,
—X is different than —X₁,
—Y is independently —H, or —Z,
—Z is independently —Cl, —Br or —I,
r=0–100% of r+t, and
t=100% of r+t, and
s=r+t.

2. The aromatic polyimide of claim 1 wherein r is 100% of r+t.
3. The aromatic polyimide of claim 2 wherein Y is H.
4. The aromatic polyimide of claim 3 wherein X is methyl and —X1 is isopropyl.
5. The aromatic polyimide of claim 3 wherein X is ethyl and —X₁ is methyl.
6. The aromatic polyimide of claim 1 wherein —Z is —Cl.
7. The aromatic polyimide of claim 6 wherein t is 100% of r+t.
8. The aromatic polyimide of claims 7 wherein —X and —₁ are ethyl.

* * * * *

UNITED STATES PATENT AND TRADEMARK OFFICE
CERTIFICATE OF CORRECTION

PATENT NO. : 4,851,505
DATED : July 25, 1989
INVENTOR(S) : Richard Allen Hayes

It is certified that error appears in the above-identified patent and that said Letters Patent is hereby corrected as shown below:

Claim 1, line 39, replace "of r+t" with -- -r of r+t --.

Claim 4, line 45, replace "-XI" with -- $-X_1$ --.

Claim 8, line 53, replace "$-_1$" with -- $-X_1$ --.

Signed and Sealed this

Twelfth Day of June, 1990

Attest:

HARRY F. MANBECK, JR.

Attesting Officer    Commissioner of Patents and Trademarks